James M. Lane's Combined Skids & Truck

No. 116966 — Patented JUL 11 1871

Witnesses:
John H. Shumway
Joseph C. Earle

James M. Lane
Inventor
By his Atty.
Wm. E. Earle 116,966

UNITED STATES PATENT OFFICE.

JAMES M. LANE, OF SOUTH NORWALK, CONNECTICUT.

IMPROVEMENT IN COMBINED SKIDS AND TRUCKS.

Specification forming part of Letters Patent No. 116,966, dated July 11, 1871.

*To all whom it may concern:*

Be it known that I, JAMES M. LANE, of South Norwalk, in the county of Fairfield and State of Connecticut, have invented a new Improvement in Skids and Truck; and I do hereby declare the following, when taken in connection with the accompanying drawing and the letters of reference marked thereon, to be a full, clear, and exact description of the same, and which said drawing constitutes part of this specification, and represents, in—

Figure 1:
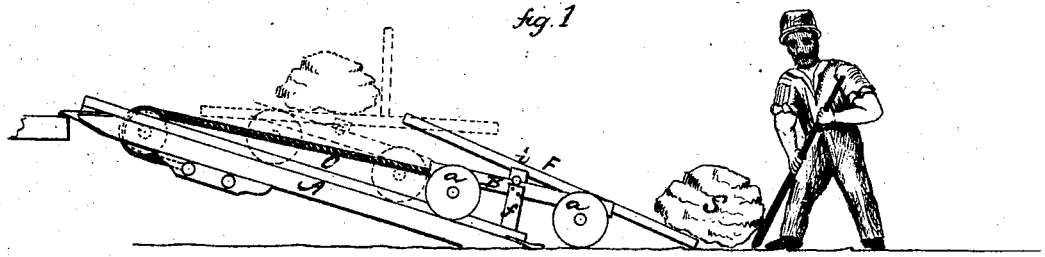
Figure 2:
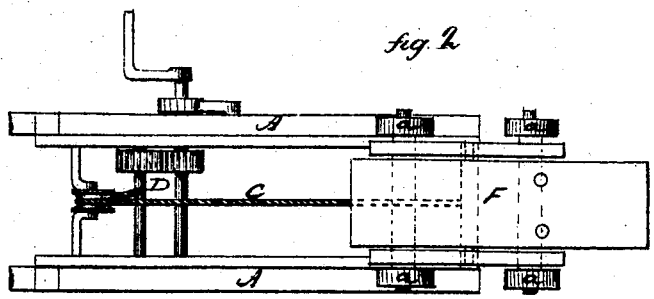

Figure 1, a side view as in position; Fig. 2, a top view; and in Fig. 3, an end view.

This invention relates to an improvement in the construction of skids and truck for the same, the object being to facilitate the loading of heavy articles; and it consists in the arrangement, upon a skid, of a truck provided with a tilting-table, combined with a mechanism for drawing the truck up the skids, all as more fully hereafter described.

Figure 3:
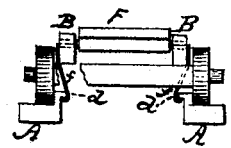

A are the beams of the skids, upon which the wheels $a$ of the truck are arranged to roll, the said beams provided with a lip, $d$, upon the inside, and the body or frame B attached to the skids by a hooked arm, $f$, extending from the said body, beneath the said lips, as in Fig. 3, which prevents the truck from being thrown from the track. An ordinary windlass, D, is arranged in convenient position on the skids, from which a rope or chain, C, extends to the truck, so that, by the said windlass, the truck may be drawn up or lowered down the skids, as the case may be. F is a table, arranged upon the truck to tilt upon a bearing, $i$, as from the position in Fig. 1 to that denoted in broken lines in the same figure.

To load heavy articles the upper end of the skids is placed at the desired elevation and the truck run down to the article to be loaded, here represented as a stone, S, in Fig. 1. The body is tilted down to rest upon the earth, thus facilitating the rolling of the stone onto the body, and when onto the table and moved forward of the center, as denoted in broken lines, the table tips down to nearly a level position, and in that position is drawn up to the desired elevation, the forward end of the table being down so far in front as to make it easy to move the weight from the table. The tilting of the table affords equal facility for loading onto the truck to carry the weight down the skids.

I claim as my invention—

The combination of the skids and truck, as herein described, the said truck provided with a tilting-table, F, the whole constructed as herein set forth to carry the truck up and down the skids.

JAS. M. LANE.

Witnesses:
A. J. TIBBITS,
JOHN H. SHUMWAY.